United States Patent

Yuda

[11] 4,334,659
[45] Jun. 15, 1982

[54] PLASTIC RETAINING-FASTENING DEVICE

[75] Inventor: Takuo Yuda, Yokohama, Japan

[73] Assignee: Nifco Inc., Tokyo, Japan

[21] Appl. No.: 168,955

[22] Filed: Jul. 11, 1980

[51] Int. Cl.$^3$ .............................................. F16L 3/08
[52] U.S. Cl. .................... 248/73; 24/17 AP;
248/74 A; 248/74 PB; 248/221.4
[58] Field of Search ............... 248/71, 73, 74 B, 74 A,
248/74 PB; 24/16 PB, 17 A, 17 AP, 326

[56] References Cited
U.S. PATENT DOCUMENTS

| 2,366,456 | 1/1945 | Pheazey | 248/73 |
| 2,397,680 | 4/1946 | Morehouse | 248/74 B |
| 3,157,377 | 11/1964 | Orenick | 248/71 |
| 3,848,840 | 11/1974 | Umezw | 248/74 PB X |

Primary Examiner—Ramon S. Britts
Attorney, Agent, or Firm—Jerold M. Forsberg; Thomas W. Buckman; Jack R. Halvorsen

[57] ABSTRACT

A plastic retaining-fastening device comprising a retaining piece adapted to be wrapped around an article subjected to fastening and a pair of leg segments adapted so as to form one leg with check claws for insertion into a fitting hole bored in a given support plate on being juxtaposed to and pressed against each other, the improvement including having the retaining piece provided at the opposite ends; operating means adapted to release the check claws from their fast engagement with the edges of the fitting hole in the support plate. Owing to this improvement, the device once fastened to the support plate can be released from the support plate by actuating the operating means directly from the front side of the support plate.

6 Claims, 4 Drawing Figures

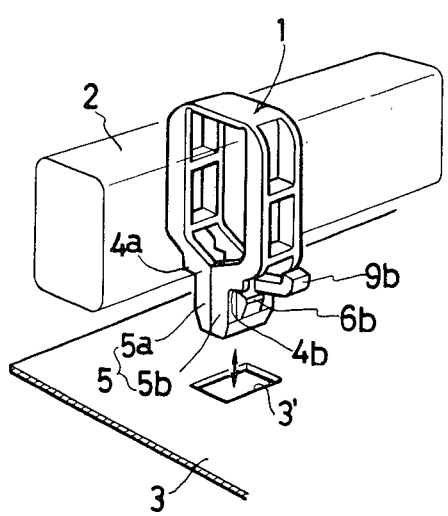
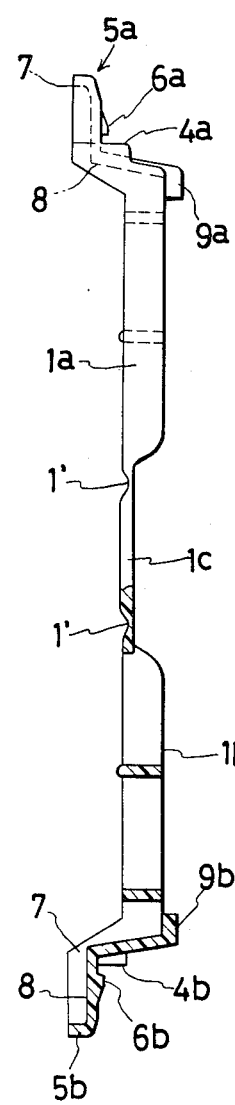
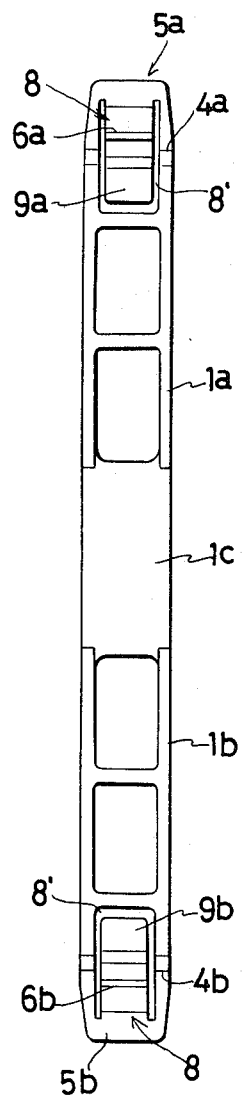
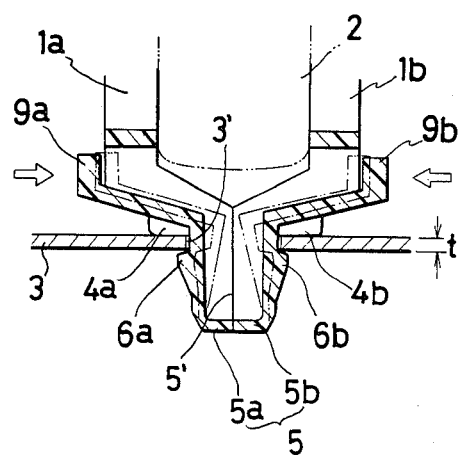

PLASTIC RETAINING-FASTENING DEVICE

BACKGROUND OF THE INVENTION

This invention relates to a plastic retaining device for fastening various articles such as machine parts, cords or pipes to a support plate such as a machinery support or vehicle chassis by having the device wrapped around the article and then causing a consequently formed anchor-shaped leg thereof to be fixed within a preformed aperture in the support plate.

Heretofore, plastic retaining devices adapted to be wrapped around an article or cable subjected to fastening and fastened to a given support by means of anchor-shaped legs forming a part of the devices have been known to the art, e.g., U.S. Pat. Nos. 3,157,377 and 3,501,117.

In the conventional plastic retaining devices the anchor-shaped legs are designed so that once they are inserted into fitting holes bored in support plates from one side thereof, the check claws formed on the legs come into unbreakable engagement with the edges of the fitting holes on the other side thereof. When these devices are properly engaged in the fitting holes, it is difficult to remove them from the support plates. Thus, the adoption of these devices has been inevitably limited to those articles which are destined to be permanently fastened to their respective support plates.

SUMMARY OF THE INVENTION

An object of this invention is to provide a plastic retaining-fastening device which can easily be attached to and detached from a support plate.

To accomplish the object described above according to the present invention, there is provided an improvement in and concerning the plastic retaining-fastening device of the type comprising a retaining piece adapted to be wrapped around an article and a pair of extensions projecting from the opposite ends of the retaining piece. The improvement particularly involves the extensions, which when juxtaposed to and pressed against each other form one leg which in turn is provided with check claws. The formed one leg is suitable for insertion into a fitting hole bored in advance in a support plate. The improvement includes operating means adapted to release the check claws from their fast engagement with the edges of the fitting hole in the support plate.

The plastic retaining-fastening device of the present invention is improved, as described above, so that the check claws of the anchor leg, when brought into fast engagement with the edges on the rear side of the fitting hole in the support plate after the device has been wrapped around an article subjected to fastening and the consequently formed leg has been forced into the fitting hole, can be released from the engagement by actuating the operating means. The actuation is directly possible from the front side of the support plate, enabling the device to be readily removed from the fitting hole. The adoption of the device of this invention, therefore, need not be limited to those articles destined to be permanently fastened to their respective support plates. When the device is used for a thermostat, for example, the thermostat fastened to a proper support plate can readily be removed whenever there arises a necessity for inspecting, repairing or replacing the thermostat.

The other objects and the characteristic features of this invention will become apparent from the detailed description to be given hereinafter with reference to the accompanying drawings.

BRIEF DESCRIPTION OF THE DRAWING

FIG. 1 is a perspective view of one embodiment of a retaining-fastening device according to this invention showing the relationship of the device to an article subjected to fastening and a fitting hole in a support.

FIG. 2 is a partially sectioned side view of the retaining-fastening device of FIG. 1 in its relaxed or molded condition.

FIG. 3 is a plan view of the retaining-fastening device of FIG. 1 in its relaxed or molded condition.

FIG. 4 is an enlarged cross section of the part of the retaining-fastening device of FIG. 1 which is inserted and retained within the fitting hole.

DESCRIPTION OF THE PREFERRED EMBODIMENT

FIG. 1 illustrates the device of this invention in a state having an article 2 encircled by a retaining piece 1. The retaining piece 1 possesses flat edge surfaces 4a, 4b adapted to come into contact with the front surface of a support plate 3. Leg segments 5a, 5b extend from adjacent these edge surfaces 4a, 4b, at substantially a right angle thereto. Leg segments 5a, 5b are adapted so that they form a leg 5 suitably sized for insertion into a fitting hole 3', of a predetermined size, bored in advance in the support plate 3, when their respective opposed surfaces 5' are brought into mutual intimate contact. The retaining piece 1 and the leg segments 5a, 5b are integrally molded of a plastic material such as polypropylene resin which has suitable elasticity to permit the retaining piece 1 to be wrapped around the article 2. In the present embodiment, since the fitting hole is a rectangular fitting hole 3', the leg segments 5a, 5b are designed so that they form a leg of a cross section substantially conforming to the shape of the aforementioned fitting hole 3' when they are brought together to form leg 5.

The leg segments 5a, 5b respectively have check claws 6a, 6b which protrude from the outer sides opposite from the respective opposed surfaces 5'. Between the ends of the retaining piece 1, i.e. from directly inside the edge surfaces 4a, 4b, and the leading ends of the leg segments 5a, 5b, sturdy shells 7, which open toward the opposed surfaces 5' of the leg segments, are formed in a hollow shape. In the shells 7, cuts 8' each of the shape of three sides of a rectangle are made to form tongue pieces 8 which have their free ends thereof slanted upwardly. The aforementioned check claws 6a, 6b are formed by the thickness of these tongue pieces 8 being increased in the respective middle portions thereof so as to protrude outwardly of the leg 5. The distances between the upper ends of the check claws 6a, 6b and the edge surfaces 4a, 4b of the retainer piece 1 are each substantially equal to the thickness "t" of the support plate 3.

The free ends of the tongue pieces 8 are bent outwardly, respectively, above the edge surfaces 4a, 4b, and are extended to form operating pieces 9a, 9b.

For the article 2 to be fastened to the front surface of the support plate 3, the retainer piece 1 is wrapped around the article 2 to hold it in position therein and, at the same time, the leg segments 5a, 5b are brought into tight contact with each other to form a leg 5. Then, this leg 5 is inserted through the fitting hole 3' in the support plate 3. When the check claws 6a, 6b are pushed back by the entrance edges of the fitting hole 3', during the insertion of the leg, the tongue pieces 8 are bent into the hollow spaces enclosed by the shells 7. The check claws 6a, 6b are forced inwardly relative the outer sides of the leg segments 5a, 5b and allowed to slide past the entrance edges of the fitting hole 3'. After passing the outlet edges of the fitting hole, the check claws 6a, 6b are then biased by the resilience of the material to a position where the check claws extend outwardly of the outer sides of the leg segments. When the leg 5 is inserted into the fitting hole 3', and when the edge surfaces 4a, 4b of the retainer piece 1 come into contact with the front surface of the support plate, the retaining-fastening device is fixed in the support plate. The edges of the fitting hole 3' are positioned between the edge surfaces 4a, 4b of the retainer piece and the check claws 6a, 6b of the leg segments thereby securely fixing the device relative to the panel. Thus, the device brings the article 2 as retained by the retainer piece 1 into fast attachment to the support plate 2. Whenever there arises a necessity for removing the article 2, for the purpose of inspection, repair or replacement, for example, the removal is simply accomplished by giving a squeeze to the operating pieces 9a, 9b bent and extended outwardly from the tongue pieces 7 with finger tips or a proper tool. When such squeezing force is applied, the tongue pieces 8 are bent into the hollow spaces enclosed by the shells 7 and the check claws 6a, 6b are thereby retracted inwardly to release their engagement with the edges on the reverse side of the fitting hole 3' (as shown by the chain line in FIG. 4). Simultaneous application of a squeeze to the operating pieces 9a, 9b and a pull on the device, results in instantaneous, smooth removal of the device from the fitting hole 3'.

Desirably, the operating pieces 9a, 9b, which are formed by the upwardly slanted free ends of the tongue pieces 8, are allowed to protrude from the retainer piece 1 when wrapped around the article (as illustrated in FIG. 4), so that the work of removal of the device by the actuation of these operation pieces will be facilitated. Optionally, during the fastening of the device to the support plate, these operating pieces 9a, 9b may be utilized for facilitating the operator's job of inserting the leg 5 into the fitting hole 3' by furnishing him with a convenient hold on the device until the edge surface 4a, 4b of the retainer piece come into intimate contact with the front surface of the support plate.

The leg 5 is shown in FIG. 1 as possessing a rectangular cross section because the fitting hole 3' is formed in a rectangular shape. Clearly, if the fitting hole 3' has a circular shape, then the cross section of the leg is circular. The shape of the cross section must be in conformity with the shape of the fitting hole.

When the retainer piece 1 is molded in a flat shape, as illustrated in FIGS. 2 and 3, the metal die to be used for the molding of the retainer piece becomes simple. The retainer piece 1, illustrated in the drawing, is formed of two ladder-like segments 1a, 1b connected through thin-walled portions 1' to a central belt-shaped portion 1c, so as to permit the device to be wrapped completely around an article having a generally rectangular cross section. The thin walled sections 1a, 1b, acting as live hinges. Optionally, the retainer piece 1 may be formed wholly as one belt-shaped piece or in some other shape so as to conform to the cross section of a particular shape of article to be wrapped therewith.

As is clear from the description given above, the retaining-fastening device according to this invention can be used for attaching a given article to the support plate by having the device wrapped around the article and then causing the consequently formed leg to be forced into the fitting hole in the support plate until the check claws are brought into fast engagement with the edges of the fitting hole on the rear side of the support plate. When the device is desired to be removed from the support plate, the device can readily be removed from the fitting hole by actuating the operating pieces directly on the front side of the support plate. Thus, the adoption of the device of this invention is not limited to those articles which are destined to be permanently fastened to their respective supporting plates. The device is usable with articles which require occasional removal from their support plates for the purpose of inspection, repair or replacement. Since the retaining-fastening device of this invention can be molded integrally by injection molding using a plastic material, it is suitable for mass production and can be produced at low cost.

What is claimed is:

1. A plastic retaining-fastening device comprising a retaining piece adapted to be wrapped around an article subjected to fastening and a pair of leg segments projecting from the opposite ends of the retaining piece and adapted so that the leg segments, when juxtaposed to and pressed against each other, form one leg means suitable for insertion into a fitting hole bored in a support plate, each of the leg segments provided with check claws adapted to securely retain the device relative to the support plate, the improvement which comprises providing the leg segments with operating pieces adapted to release the check claws belonging to each respective leg segment from the fast engagement thereof with the edges of the fitting hole in the support plate.

2. A plastic retaining-fastening device according to claim 1, wherein each of the leg segments has a body portion between an end of the leg segment attached to the end of the retaining piece and a leading end, each body portion has cuts of the shape of three sides of a rectangle therein to form tongue pieces, each tongue has its free end slanted upwardly and has its thickness increased along the middle portion thereof to form the check claws, the free end of each of the tongue pieces is bent out of axial alignment with the body portion to an accessible position outwardly of said retaining piece thereby forming operating pieces adapted to, upon actuation, release each respective check claw from engagement with said aperture.

3. A plastic retaining-fastening device according to claim 2, wherein the leg segments are formed so as to protrude radially outwardly beyond the boundary of the aperture above and below the support to limit axial movement of the said one leg means within said aperture.

4. A plastic retaining-fastening device according to claim 1, wherein said one leg means has hollow space therein into which said check claws may be deflected to permit the withdrawal of the said one leg from said fitting hole.

5. A plastic fastening device adapted to be releasably attached to a support plate having an aperture of a predetermined size therein, the plastic fastening device including a retaining piece adapted to be wrapped around an article subjected to fastening and at least one aperture engaging means projecting from one end of the retaining piece and adapted to be releasably secured within the aperture in the support, wherein said aperture engaging means comprises leg means, said leg means having at least two spaced apart leg portions, an end portion and a resilient actuable claw means, said end portion attaching the distal ends of said leg portions relative to one another with said claw means attached at one end to said end portion between the distal ends of said leg portions, said claw means having a detent means and a free end, wherein said aperture engaging means may be released from engagement with said aperture by operating said free end of said claw means so as to disengage said detent means and thereby permit removal of the fastening device from the support.

6. A plastic fastening device according to claim 5, wherein said aperture engaging means has a hollow space into which the claw means may be deflected to permit the withdrawal of the said aperture engaging means from said aperture in said support plate.

* * * * *